Patented Sept. 11, 1945

2,384,502

UNITED STATES PATENT OFFICE 2,384,502

METHOD OF PREVENTING CORROSION BY PHOSPHORUS

Johann S. Streicher, Newark, N. J., assignor to The American Platinum Works, Newark, N. J., a corporation of New Jersey No Drawing. Application November 21, 1942, Serial No. 466,503

3 Claims. (Cl. 23—1)

This invention is concerned with chemical apparatus for the incineration of organic substances containing phosphorus.

This application is a continuation in part of my previous co-pending application Serial No. 399,235, filed June 21, 1941.

In the incineration of flour, starch, plant juices, and other organic substances for the ash determination thereof, it is customary to use so-called laboratory ware, such as crucibles, dishes, or the like, constructed of platinum. Such incineration apparatus tends, however, to deteriorate badly during repeated use. The early deterioration and consequent short life of incineration apparatus as now known is due to the phosphorus content of the ashes resulting from the incineration. Organic substances such as flour, starch, plant juices, and the like, contain phosphorus in chemical combination as in the form of organic compounds such as amylopectin, etc. During the breaking down process in the incineration the organic compounds containing phosphorus form metaphosphoric acid and finely divided carbon in the presence of neutral or reducing atmospheres. At temperatures as low as 600° C. the finely divided carbon acts in status nascens upon the metaphosphoric acid with the result that phosphorus vapors are formed. The platinum of the incineration apparatus acts, when hot, as a "getter" toward such phosphorus vapors whereby there is formed a brittle platinum phosphide melting at as low a temperature as 533° C. Such low melting brittle compounds, formed predominantly along the edges of the platinum crystals, cause an early deterioration of the apparatus whereby the usefulness of such apparatus is terminated at an early date. Such deterioration is greatly enhanced at elevated temperatures such as about 950° C. and more.

Like phosphorus corrosion is observed in other cases involving the liberation of phosphorus from organic substances contained within the chemical apparatus described. In the volatile matter test of coal, for instance, a sample of coal powder is heated under a reducing atmosphere in a covered platinum crucible or the like and the finely divided carbon acts upon the ash constituents of the coal, producing phosphorus fumes which cause deterioration of the platinum apparatus. Or in the determination of phosphoric acid in the form of magnesium pyrophosphate, a magnesium ammonium phosphate is ignited at about 1000° C. in a platinum crucible, often in the presence of filter paper or hydrogen of gas flames, with a liability of phosphorus fumes being evolved.

It is one object of this invention to provide incineration apparatus which shall have a longer useful life than like incineration apparatus now known. It is another object of my invention to provide a chemical apparatus for the incineration of organic substances containing phosphorus which shall not display the aforesaid liability of incineration apparatus as now known toward phosphorus corrosion. Other objects and advantages of my invention will appear from the description thereof hereinafter following.

I have found a novel chemical apparatus which when in contact with phosphorus fumes evolved from organic substances contained in such chemical apparatus will not suffer from early deterioration as the result of phosphorus corrosion as now observed in the case of platinum incineration apparatus. The apparatus for the incineration of organic substances containing phosphorus is constructed of an alloy of platinum with gold wherein the gold content constitutes at least 0.2% and not more than about 6%. The presence in the alloy of as little as 0.2% gold produces an apparatus having definitely improved properties, as compared with apparatus of platinum as such, although the improved properties are most noticeable when the alloy of the apparatus contains at least about 0.6% to 1% of gold. The maximum limit of gold in the alloy lies at about 6%. The apparatus of the invention may have any suitable shape such as commonly given to crucibles, dishes, and the like, now in common use for incineration processes.

I have found that chemical incineration apparatus constructed of alloys of platinum with gold, containing from 0.2% to about 6% gold, not only possess great heat resistance, high corrosion resistance generally, high melting point, great mechanical strength, but also possess great resistance to phosphorus corrosion as the result of the presence of phosphorus fumes during the incineration process, whereby the apparatus of the invention is not only favorably distinguished from like apparatus of platinum in its general properties, but is primarily adapted to overcome the drawback of short useful life now commonly associated with platinum incineration apparatus. The great resistance to such phosphorus corrosion of the incineration apparatus of my invention is due primarily to the extremely slow "getter" action of platinum gold alloys, as described, toward phosphorus fumes.

The superiority of my new incineration apparatus has been determined in quantitative as well as qualitative experiments and actual practice has shown that the new apparatus has a considerably longer useful life than like apparatus of platinum as heretofore known. In actual practice I recommend particularly crucibles, dishes, and other like incineration apparatus constructed of platinum gold alloys containing about 99% platinum and 1% gold, about 97% platinum and 3% gold, or about 95% platinum and 5% gold. The tensile strength of such apparatus is, in terms of kilograms per square millimeter after 1 hour annealing at 1000° C., 22.7 for apparatus of an alloy of 99% platinum and 1% gold, 29.6 for apparatus of an alloy of 97% platinum and 3% gold, and 40.9 for apparatus of an alloy of 95% platinum and 5% gold. Notwithstanding other advantages of the apparatus of the invention over like apparatus as heretofore known in regard to mechanical strength, general corrosion resistance such as resistance to alkali corrosion, etc., the outstanding advantage of the apparatus of the invention is the slow "getter" action thereof toward phosphorus fumes, whereby the useful life of such apparatus is greatly increased over like apparatus as heretofore known.

The construction material of the incineration apparatus according to this invention may, of course, also contain in addition to the specified content of platinum and gold, small quantities of other metals which are not harmful to the function of such apparatus and may contain, for instance, up to about 10% rhodium or other metals of the platinum group.

What I claim is:

1. The method of incinerating organic substances containing phosphorus, comprising incinerating said organic substance in an incinerating vessel constructed of an alloy of platinum and gold containing from 0.2% to about 6% gold.

2. The method of incinerating organic substances containing phosphorus, comprising incinerating said organic substance in an incinerating vessel constructed of an alloy of platinum and gold containing from 1% to 5% gold.

3. The method of incinerating organic substances containing phosphorus, comprising incinerating said organic substance in an incinerating vessel constructed of an alloy of platinum and gold containing about 3% gold.

JOHANN S. STREICHER.